United States Patent
Mangla et al.

(10) Patent No.: US 11,080,464 B2
(45) Date of Patent: Aug. 3, 2021

(54) CORRECTION TECHNIQUES OF OVERLAPPING DIGITAL GLYPHS

(71) Applicant: Adobe Inc., San Jose, CA (US)

(72) Inventors: Pooja Mangla, Vancouver (CA); Aman Arora, New Delhi (IN)

(73) Assignee: Adobe Inc., San Jose, CA (US)

(*) Notice: Subject to any disclaimer, the term of this patent is extended or adjusted under 35 U.S.C. 154(b) by 0 days.

(21) Appl. No.: 16/515,642

(22) Filed: Jul. 18, 2019

(65) Prior Publication Data

US 2021/0019365 A1 Jan. 21, 2021

(51) Int. Cl.
*G06F 40/106* (2020.01)
*G06K 9/00* (2006.01)
*G06F 40/166* (2020.01)

(52) U.S. Cl.
CPC .......... *G06F 40/106* (2020.01); *G06F 40/166* (2020.01); *G06K 9/00463* (2013.01)

(58) Field of Classification Search
CPC ...... G06F 40/109; G06F 40/103; G06F 40/10; G06F 40/106; G06F 40/166; G06F 40/205; G06K 40/10; G06K 2209/01; G06K 2215/0068; G06K 9/00449; G06K 9/00463; G06K 9/34; G06T 11/60
See application file for complete search history.

(56) References Cited

U.S. PATENT DOCUMENTS

| | | | | |
|---|---|---|---|---|
| 5,399,029 A * | 3/1995 | Muraoka | ................ | G06K 15/02 400/9 |
| 5,501,538 A * | 3/1996 | Sawada | .................. | B41B 19/00 400/304 |
| 5,590,257 A * | 12/1996 | Forcier | ................... | G06F 40/10 715/273 |
| 5,623,593 A * | 4/1997 | Spells, III | ............. | G06K 15/02 345/472 |
| 5,803,629 A * | 9/1998 | Neville | ................. | G06F 40/109 400/304 |
| 6,426,751 B1 * | 7/2002 | Patel | ..................... | G06F 40/109 345/468 |
| 10,127,673 B1 * | 11/2018 | Ben Khalifa | ...... | G06K 9/00463 |
| 2008/0238927 A1 * | 10/2008 | Mansfield | .............. | G06T 11/60 345/467 |
| 2010/0315431 A1 * | 12/2010 | Smith | ..................... | G06T 11/20 345/619 |

(Continued)

OTHER PUBLICATIONS

Sederberg,"Curve Intersection Using Bezier Clipping", Nov. 1990, pp. 538-549.

*Primary Examiner* — Wilson W Tsui
(74) *Attorney, Agent, or Firm* — FIG. 1 Patents

(57) ABSTRACT

Digital glyph overlap correction system implemented as part of a computing device is described. The system is configured to improve detection and correction of overlaps of digital glyphs by detecting on overlap of digital glyphs within a digital document, determining a glyph property causing the overlap, determining a change to the parameter of the glyph property that causes the overlap, generating a correction for the overlap based on the change to the parameter, and rendering the digital document as having the correction. The digital glyph overlap correction system corrects or facilitates correction of the overlap in an efficient and seamless manner, thereby improving the aesthetic appeal of content within the digital document.

20 Claims, 16 Drawing Sheets

(56) References Cited

U.S. PATENT DOCUMENTS

| | | | | |
|---|---|---|---|---|
| 2012/0144355 A1* | 6/2012 | Dai | ...................... | G06F 30/398 |
| | | | | 716/112 |
| 2015/0347356 A1* | 12/2015 | Beaver | .................. | G06F 40/163 |
| | | | | 345/472 |
| 2019/0317980 A1* | 10/2019 | Dhanuka | ............... | G06F 40/166 |

* cited by examiner

CORRECTION TECHNIQUES OF OVERLAPPING DIGITAL GLYPHS

BACKGROUND

Digital content generation systems include digital content editing tools that enable users to correct errors associated with the positioning of characters, e.g., digital glyphs, within a digital document. An example of such an error is when two digital glyphs overlap within the digital document. For example, a digital glyph might appear over a portion of another digital glyph, thereby creating an unintended and undesirable appearance of the glyphs. Such errors may be based on a parameter of one or more glyph properties, e.g., skewing, scaling, layout designs, kerning, glyph baselines, etc., having an incorrect value. These errors reduce the legibility of content within the digital document, in addition to worsening the design quality and aesthetic appeal of the digital document and content within the digital document.

Conventional techniques of correcting these errors are tedious, time-consuming, and ineffective. In one conventional example, a user manually reviews each line of text or text frame of the digital document to identify overlaps. Because manual review relies on the user's accuracy in identifying overlaps, multiple overlaps may be missed in practice. Even if an overlap is accurately identified by the user, conventional techniques are not capable of readily identifying the glyph property that caused the overlap and thus also require the user to engage in a potentially tedious process of identifying the glyph property that caused the overlap. Further, once an overlap is identified, conventional techniques also require the user to manually determine a way to correct the overlap caused by the glyph property. Thus, users are forced to manually explore ways of correcting the error, typically resulting in multiple attempted changes in a parameter as well as glyph property. Such exploration is tedious, error-prone, and fails to ensure that all the digital glyph errors are effectively identified and corrected. Moreover, such exploration is inefficient with respect to the user as well as computationally inefficient with respect to computing devices that implement these conventional techniques. Conventional techniques also prevent users from determining changes to parameters of multiple glyph properties simultaneously, one or more of which may have caused the error. As such, conventional techniques limit a user's ability to find the optimal way of correcting the overlap and hinder operation of computing devices that implement the conventional techniques.

In sum, conventional techniques require users to manually review each text frame of a digital document to identify digital glyph overlaps, explore ways of correcting these overlaps manually, and restrict the error correction exploration process to changing a parameter of only one glyph property at any given time. These limitations result in unidentified glyph errors in a digital document, causing poor design quality and worsening the aesthetic appeal of content within the digital document.

SUMMARY

Digital glyph overlap correction techniques implemented by a computing device are described herein. The glyph overlap correction techniques are configured to correct an error related to digital glyphs, e.g., an overlap of digital glyphs, within a digital document by identifying the glyph property that causes the error and correcting the error by changing a parameter of the glyph property, which may be performed automatically and without user intervention by a digital glyph overlap correction system. In one example of a digital glyph overlap correction system, an overlap of digital glyphs in the digital document is first detected. The overlap may be caused by a portion of a digital glyph in a digital document as appearing over a portion of another digital glyph in the digital document, thereby creating an unintended and undesirable appearance. In one instance, the digital glyph overlap correction system automatically generates an indication of the overlap of the digital glyphs in a user interface. The indication, for instance, may visually highlight the overlap within the digital document, though underlining, marking the perimeter of the overlap with a box. Other such configurations are also contemplated.

Next, the digital glyph overlap correction system determines a glyph property causing the overlap of digital glyphs, e.g., kerning, layout design, skewing, scaling, baseline shift, and so forth and generates a recommendation to correct the overlap of the digital glyphs. In one example, the recommendation includes the glyph property and a suggested change to a parameter of the glyph property. The recommendation is displayed in the form of e.g., pop-up window or dialog box, that includes the glyph property and the suggested change to a parameter of the glyph property displayed adjacent to the glyph property. Upon selection of the recommendation, the digital glyph overlap correction system corrects the overlap by applying the suggested change to a parameter of the glyph property. The recommendation may include multiple glyph properties, each of which has an associated parameter.

Alternatively, the digital glyph overlap correction system may determine a glyph property that causes the overlap, determine a change to a parameter of the glyph property, and automatically correct the overlap of the digital glyphs based on the change to the parameter automatically and without user intervention. This may also be performed for multiple overlaps. Thereafter, upon correction of the overlap, the digital document is rendered in a user interface as having the correction in a user interface of the computing device.

In this way, the digital glyph overlap correction system overcomes the limitations of conventional techniques, namely the inability of conventional techniques to identify overlaps of digital glyphs within the digital document without requiring the user to manually review each line of text or text frames within the document, or suggest a way of correcting the overlap after identification. The digital glyph overlap correction system described herein addresses these limitations by identifying an overlap and correcting or facilitating correction of the overlap in an efficient and seamless manner, thereby reducing occurrence of digital glyph errors within a digital document. In this way, the system described herein improves the aesthetic appeal of content within the document and improves operational and computational efficiency of a computing device that implements these techniques.

This summary introduces a selection of concepts in a simplified form that are further described below in the Detailed Description. As such, this Summary is not intended to identify essential features of the claimed subject matter, nor is it intended to be used as an aid in determining the scope of the claimed subject matter.

DETAILED DESCRIPTION

Overview

Figure 1:
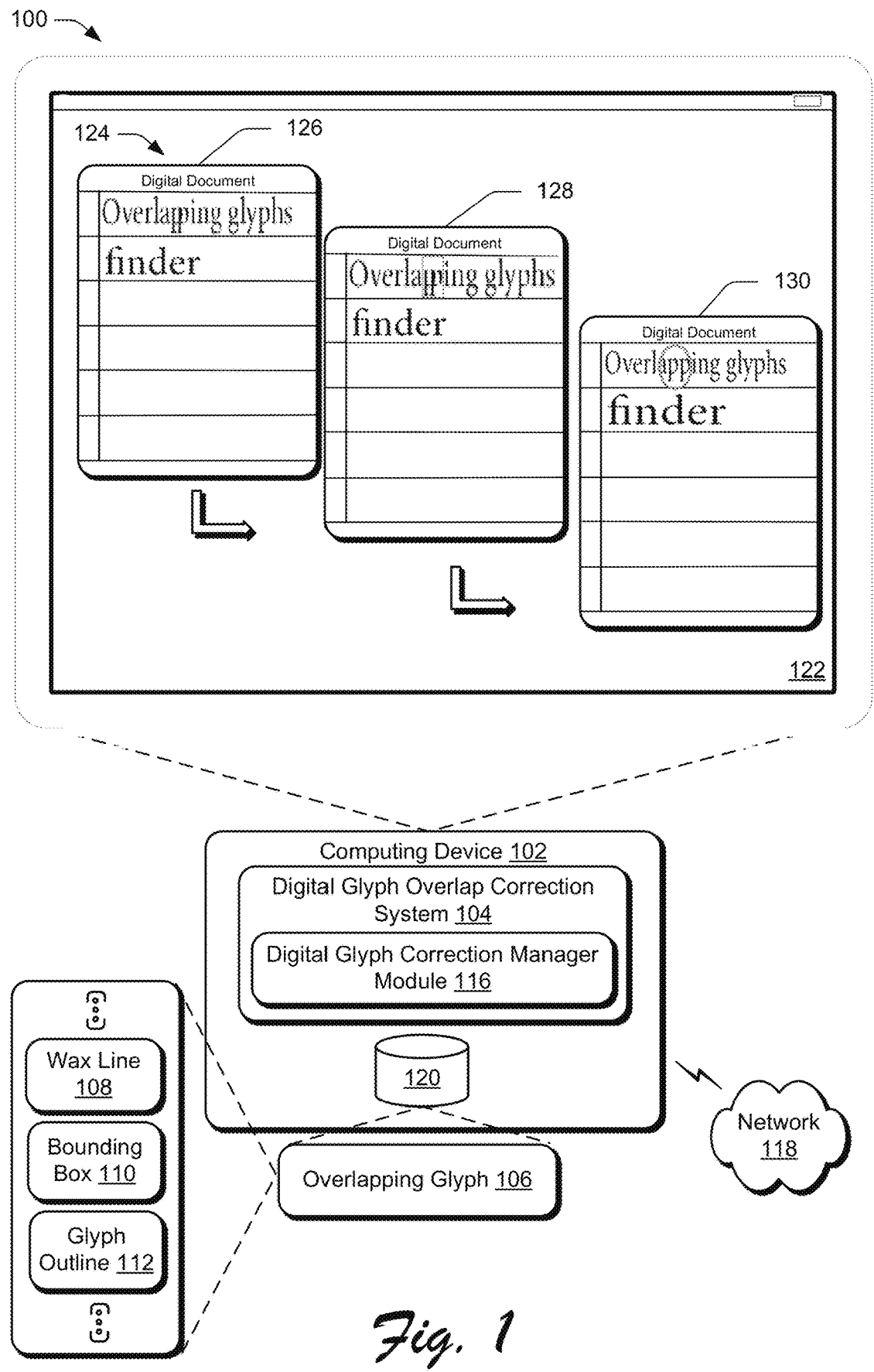
FIG. 1 is an illustration of a digital glyph overlap correction system operable to correct an error related to digital glyphs within a digital document.

Conventional techniques of identifying an overlap of digital glyphs in digital content are confronted with numerous challenges. As stated above, a digital document may include overlapping digital glyphs caused by a variety of glyph properties, e.g., such as skewing, scaling, layout designs, kerning, glyph baselines, etc. In some instances, a parameter of one or more of these glyph properties having an incorrect value results in an unintended and undesirable positioning of the glyphs within the digital document. One example of which might be when a portion of a glyph appears directly over another glyph. Multiple such overlaps worsen the design quality and aesthetic appeal of the digital document.

Conventional techniques of correcting an overlap requires users to closely study the entire digital document and manually identify and correct overlaps of digital glyphs, which is a tedious and inefficient process. Moreover, the process inevitably results in the misidentification or lack of identification of the overlaps, especially in cases where the digital glyph designs are particularly complex or if the digital document is large and full of digital content glyphs. Even if an overlap is identified, conventional techniques are not capable of informing the user of the glyph property that caused the overlap, requiring the user to speculate about the property that caused the error and then estimate a change of a parameter of that property to partially correct the overlap—a suboptimal solution. As such, conventional techniques fail to correct or facilitate correction of overlaps of digital glyphs in a digital document in an optimal way.

Accordingly, a digital glyph overlap correction system is described to support digital glyph overlap correction techniques that support automated techniques that may include identifying an overlap of digital glyphs, determining a glyph property that caused the overlap, and/or correcting the overlap by changing a parameter of the glyph property. In one example, an overlap detection module of the digital glyph overlap correction system is configured to detect an overlap of digital glyphs in the digital document. As stated, these overlaps could be caused by a parameter of glyph properties such as skewing, scaling, layout designs, kerning, glyph baselines, etc., having an incorrect value. While an example of a single overlap is discussed for simplicity of the discussion, multiple overlaps of digital glyphs throughout a digital document can also be detected without departing from the techniques described herein.

From this, a glyph property determination module is configured to determine the glyph property that caused the overlap. In one example, a portion of a digital glyph representing the letter "a" may overlap with a portion of another digital glyph representing the letter "b" within a digital document. Such an overlap could be because a parameter of a glyph property of kerning related to the two digital glyphs was incorrect. While an example of a single glyph property is discussed as the cause of the overlap, the glyph property determination module is configured to identify multiple glyph properties, any one of which could be the cause of the overlap.

After determining the glyph property that caused the overlap, a parameter module is configured to determine a change to a parameter of the glyph property that caused the overlap. For example, if the glyph property determination module identifies the glyph property that caused the overlap as kerning, the parameter module determines a change to the kerning value that will correct the overlap. Alternatively, if the glyph property determination module determines multiple glyph properties possible causes of the overlap, the parameter module determines a change to a parameter corresponding to each of the glyph properties, any one of which corrects the overlap.

From this, in one example, a recommendation module is configured to generate a recommendation for correcting the overlap of the digital glyphs. As stated, the recommendation is displayed in a variety of ways (e.g., pop-up window or dialog box) that includes the determined glyph property and a suggested change to a parameter of the glyph property as appearing adjacent to the glyph property. The recommendation module is also configured to display multiple glyph properties and parameters corresponding to the respective glyph properties. From this, a reception module is configured to receive a user input selecting the recommendation. Based on the selected recommendation, a correction module is configured to correct the overlap of the digital glyphs based on the change to the parameter determined by the parameter module. Finally, a rendering module renders the digital document as having the correction in a user interface.

Alternatively, the correction module is also configured to automatically correct the overlap of digital glyphs based on the glyph property and the change to the parameter of the glyph property without the need for the recommendation module to generate a recommendation and for a user to interact with the recommendation. In one example, an overlap detection module of the digital glyph overlap correction system detects one or more overlaps of digital glyphs within the digital document. For example, digital glyphs representing letters "a" and "b" may overlap on a first line of text within a digital document, and digital glyphs representing letters "c" and "d" may overlap on a second line of text within the digital document. The glyph property determination module may then identify a glyph property, e.g., kerning, as having caused both overlaps. Specifically, the overlaps of digital glyphs representing letters "a," and "b" on the first line and "c," and "d," on the second line are because of incorrect kerning values associated with these digital glyphs.

From this, the parameter module determines changes to the perimeters of the glyph property, e.g., kerning, that corrects both overlaps. For example, the parameter module could determine that changes to the kerning parameters associated with "a" and "b," and "c," and "d" by, e.g., a value of 10, would correct both overlaps. From this, the correction module implements the automatic correction of the overlap of digital glyphs based on the determined change to the kerning parameters. After the automatic correction, the spacing between "a" and "b," and "c" and "d" changes such that no portion of "a" overlaps with "b" on the first line and no portion of "c" overlaps with "d" on the second line of the digital document.

Finally, a rendering module is configured to render the digital document as having the correction in a user interface. After the overlap's correction, the digital glyphs are displayed within the digital document at different locations. In the discussed example, the digital document with the automatically corrected digital overlaps is rendered in a user interface such that glyphs "a" and "b" on the first line and "c" and "d" on the second line are no longer overlapping.

In this way, the digital glyph overlap correction system described herein overcomes the limitations of conventional techniques, namely the inability of these techniques to efficiently identify overlaps of digital glyphs within a digital document and thus requires a user to manually review each line of text or text frames within the document. The digital glyph overlap correction system automatically identifies an overlap of digital glyphs in a digital document and automatically corrects or facilitates correction of the overlap in an efficient and seamless manner, thereby eliminating the occurrence of digital glyph errors within the document and improving the overall aesthetic appeal of content therein. The system is also configured to identify multiple overlaps within a document and automatically correct these overlaps without the need for user interaction, which further facilitates efficient creation of digital glyph based content within digital documents.

Moreover, the digital glyph correction system described herein has features that are absent from conventional techniques. The system enables the digital glyphs to remain live and editable before and after the overlap is corrected. The system is also capable of differentiating between an overlap of digital glyphs, and glyphs that are based on ligatures and discretionary ligatures. As explained below, a glyph that is based on a ligature or discretionary ligature might include a curve, design, or flourish that appears to overlap within another glyph, but does not. The system described herein can discern the differences between these ligatures and an overlap of digital glyphs and identify the overlap, while filtering out the ligatures. Thus, the accuracy of identifying glyph overlaps improves.

In the following discussion, an example environment is described that may employ the digital glyph overlap correction system described herein. Example procedures are also described which may be performed in the example environment as well as other environments. Consequently, performance of the example procedures is not limited to the example environment and the example environment is not limited to the performance of the example procedures.

Term Descriptions

As used herein, "glyphs" refer to an elemental symbol within an agreed group of symbols intended to represent a readable character for writing purposes. Each glyph represents the shapes of characters, including fonts, when the glyphs is rendered or displayed. For example, a glyph's shape can be defined by a combination of curve and line segments. The curves and segments defining a glyph can be based on Bezier curves.

As described herein, "glyph property" refers to one or more of kerning, scaling, baselines, skewing, tracking, caps, font size etc. One or more of these properties, if improperly set or defined, can cause an overlap of digital glyphs within a digital document.

As described herein, "glyph parameter" refers to a setting or value associated with the glyph property. The glyph parameter, if changed, will modify the glyph property of the digital glyph within the digital document.

As described herein, "ligature" or a standard ligature refers to specifically designed characters created by connecting or combining two or more characters into one character. In contrast to discretionary ligatures, a ligature or standard ligature is not decorative and serves to improve the appearance of characters that are present adjacent to each other in an unattractive manner, e.g., the characters "f" and "i," "f" and "l," and "T" and "h."

As described herein, "discretionary ligature" refers to a decorative ligature that is not part of the standard 256-character font layout within OpenType Fonts. Example discretionary ligatures combine frequently occurring letter pairs, e.g., "T" and "h" into a single design.

As described herein, "wax line" refers to a data structure associated with each text line in a digital document as defined herein. The wax line traces the boundaries of each text line in the digital document, and stores information associated with each text line, e.g., position of the line within the document, the number of characters in the line, line break data, etc. The wax line can also include data such as the x and y coordinates of the wax line, width data, origin, and span data.

As described herein, "glyph bounding box" or "bounding box" refers to an imaginary box specific to each digital glyph. The box is represented by four parameters—minimum and maximum coordinate values in the x and y axis. These coordinates trace the perimeter of each digital glyph such that the distance between the box and the glyph is minimized. A digital glyph's width within a digital document is calculated by subtracting the x-minimum from the x-maximum value (i.e. x-max–x-min) A digital glyph's height within a digital document is calculated by subtracting the y-minimum from the y-maximum value (i.e. y-max–y-min).

As described herein, "glyph outline points" refers to a set of points that define the shape and contours of each digital glyph. The points can define, e.g., Bezier paths or composite Bezier curves, which provide the digital glyph with its shape. The shape can also be based on other properties.

As described herein, a "glyph identifier" is a glyph identification number specific to a digital glyph. Every digital glyph is associated with a distinct glyph identifier that stores the glyph outline points that define the shape and contours of each digital glyph.

As described herein, "live text" or refers to text whose format is not converted to an outline or to a raster image. Moreover, a live text enables a user to edit various properties associated with the text, e.g., the text font can be changed and the text can be underlined etc.

Example System and Device

FIG. 1 is an illustration of the digital glyph overlap correction system 104 in which glyph overlap correction techniques are employed. The environment 100 illustrates example 124 of the digital glyph overlap correction system 104 correcting an overlap of digital glyphs within a digital document. The correction is performed by the glyph overlap correction system as implemented by computing device 102.

The computing device 102, for instance, may be configured as a desktop computer, a laptop computer, a mobile device, e.g. assuming a handheld configuration such as a tablet or mobile phone as illustrated, and so forth. Thus, the computing device 102 may range from full resource devices with substantial memory and processor resources 120 (e.g. personal computers, game consoles) to a low-resource device with limited memory and/or processing resources (e.g. mobile device). Computing device 102 is representative of a single computing device or a plurality of different devices, such as multiple servers utilized by a business to perform operations "over the cloud" as described in FIG. 9. Additionally, although illustrated as implemented locally at computing device 102, functionality of digital glyph overlap correction system 104 may also be implemented as whole or part via functionality available via the network 118, such as part of web service or "in the cloud."

The computing device 102 is illustrated as including digital glyph overlap correction system 104, which includes digital glyph correction manager module 116. In one example, the digital glyph overlap correction system 104 is implemented at least partially in hardware of computing device 102 to correct an overlap 106 of digital glyphs within a digital document by detecting an overlap of digital glyphs based on analyzing wax line 108, bounding box 110, and glyph outline 112, identifying at least one glyph property that caused the overlap of the digital glyphs, and changing a parameter associated with the glyph property that caused the overlap. These steps are performed by the system automatically and without user intervention. In the illustrated example 124 depicted in user interface 122, a digital document includes two text lines with glyph characters presented on each line. At stage 126, glyph overlap correction system 104 identifies an overlap of two digital glyphs—two glyph characters representing the letter "P" presented adjacent to each other—on the first line of text. At stage 128, the overlap is indicated by the glyph overlap correction system 104 with a box around the boundaries of the overlapping glyphs. Thereafter, the system 104 identifies a glyph property that caused the overlap, e.g., incorrectly defining kerning property of the glyphs, and automatically corrects the overlap based by changing a parameter of the kerning property. The result—elimination of the overlap—is shown at stage 130. The operation of the digital glyph overlap correction system 104 is described in further detail below.

As previously stated, conventional techniques of correcting glyph errors in digital document have deficiencies. Users are forced to manually review each text line or text frame within the digital document to identify overlaps. Because manual review relies on user accuracy, multiple overlaps may be missed in practice. Moreover, even if a user successfully identifies an overlap accurately, conventional techniques are not capable of readily identifying a glyph property that caused the overlap.

So these users are forced to explore ways of correcting the error by, e.g. manually changing parameters of glyph properties that might have caused the overlap. This process is tedious, error-prone, and might not adequately remove an overlap even if one is accurately identified. Conventional techniques also prevent users from determining changes to parameters of multiple glyph properties simultaneously, one or more of which may have caused the error. As such, these techniques limit a user's ability to find the optimal way of correcting the overlap and hinder option of computing devices that implement the conventional techniques.

Digital glyph overlap correction system 104 addresses these challenges and corrects overlaps of digital glyphs within a digital document with increase efficiency and accuracy, both with respect to a user and involving use of computational resources implementing these techniques. To achieve this, a digital glyph correction manager module 116 of digital glyph overlap correction system 102 detects an overlap of digital glyphs in a digital document, which could be caused due to a parameter of glyph properties such as skewing, scaling, layout designs, kerning, glyph baselines, etc., having an incorrect value. From this, the digital glyph correction manager module 116 determines a glyph property that caused the overlap, which could be based on one or more of the above listed glyph properties. In operation, detecting an overlap of digital glyphs involves multiple several steps. Overlaps of digital glyphs broadly fall into two categories—overlap within a single line of text and overlap across adjacent lines. In both scenarios, the common step is scanning the wax lines included in the digital document. The wax lines describe information about the text lines, including the dimensions of the perimeters of the text lines. The wax lines also contain information about the position of the text line within the document, the number of glyphs or other characters on the text line, line break data etc.

If two adjacent wax lines have values that overlap or intersect, the digital glyph correction manager module 116 analyzes the bounding boxes of the digital glyphs listed in the adjacent text lines described by the wax lines to determine if there is overlap of the bounding boxes. It is noted that every digital glyph is associated with a respective bounding box that demarks the perimeter of the digital glyph. If two bounding boxes of glyphs in adjacent lines overlap, the digital glyph correction manager module 116 analyzes the outline points of the glyphs. It is noted that every digital glyph is defined by outline points that defines the contours and shape of the digital glyph. If the digital glyph correction manager module 116 determines that the outline points of the digital glyphs intersect, the system identifies an overlap of digital glyphs. In this instance, the overlap is over two adjacent text lines. Alternatively, the digital glyph correction manager module 116 determines an overlap on a single text line by comparing the bounding boxes of all glyphs within the text line to identify if bounding boxes overlap. If so, the digital glyph correction manager module analyzes the outline points of the glyphs within the overlapping bounding boxes to determine if the outline points of the glyphs intersect. If a portion of a digital glyph appears over another portion of a digital glyph, the digital glyph correction manager module 116 determines that there is an overlap of digital glyphs within the single text line. In this way, one or more overlaps of digital glyphs are detected in a document.

Next, the digital glyph correction manager module 116, determines a glyph property that caused overlap. As stated, the overlap could be caused by a one or more of a variety of glyph properties, e.g., kerning. From this, the digital glyph correction manager module 116 determines a change to a parameter of the glyph property, which, when applied to the overlapping digital glyphs, will correct the overlap. If, for example, the glyph property that caused the error was kerning, then a determined change to a parameter could be changing the glyph property of kerning associated with the glyphs by a particular value. The glyph correction manager module 116 corrects the overlap by implementing a change to the parameter and then renders the digital document in a user interface with the correction.

In this way, as stated above, the digital glyph overlap correction system 104 addresses the limitations present in conventional techniques, namely the inability to automatically identify overlaps of digital glyphs within a digital document, correct overlaps in an efficient and seamless manner, and improve the aesthetic appeal of content in the document.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Correction of Overlapping Digital Glyphs

Figure 2:
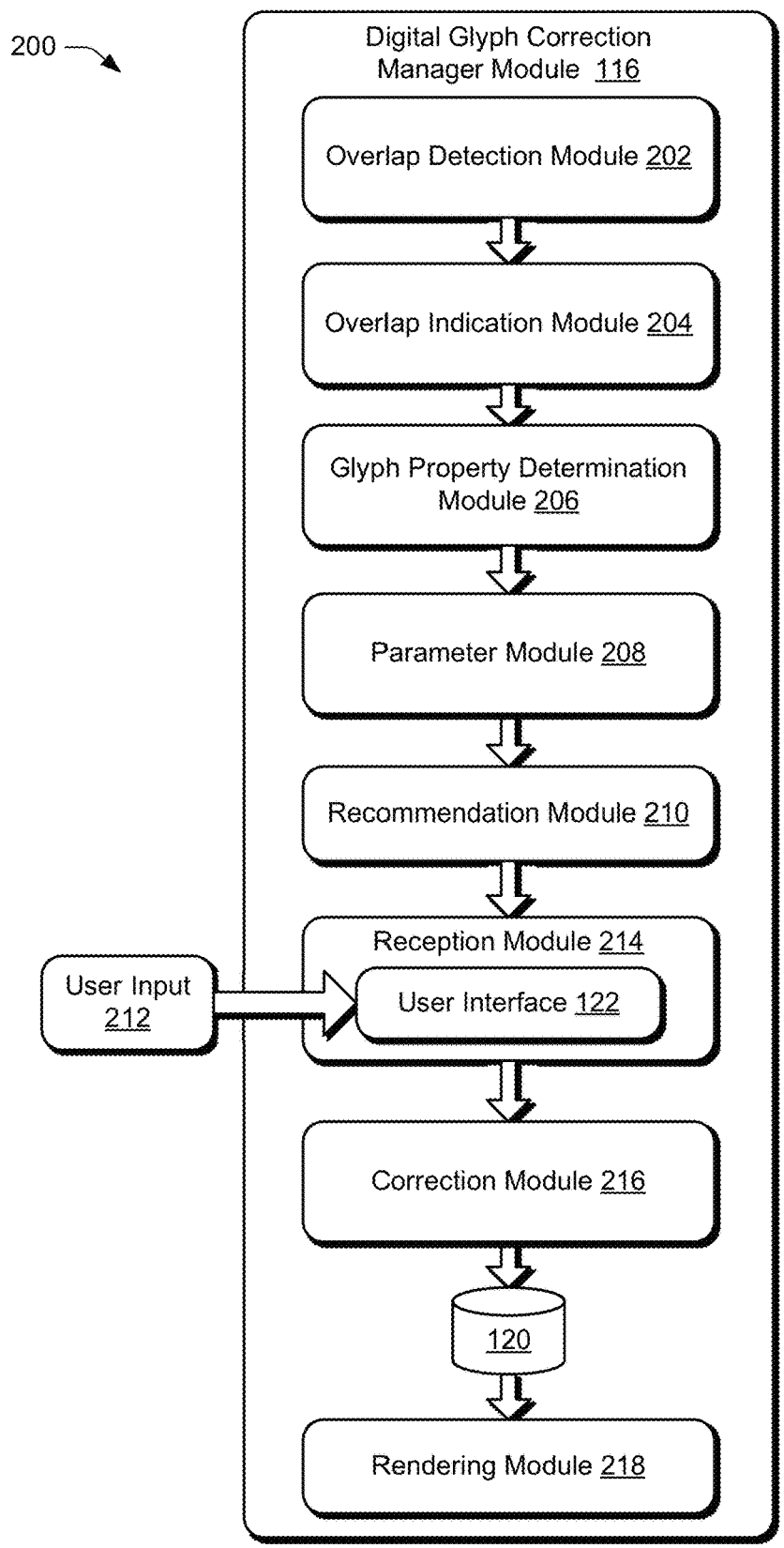
FIG. 2 depicts an example illustration of a digital glyph correction manager module within the digital glyph overlap correction system that includes an overlap detection module, an overlap indication module, a glyph property determination module, a parameter module, a recommendation module, a reception module, a correction module, and a rendering module in greater detail to support digital glyph overlap correction techniques.
Figure 3:
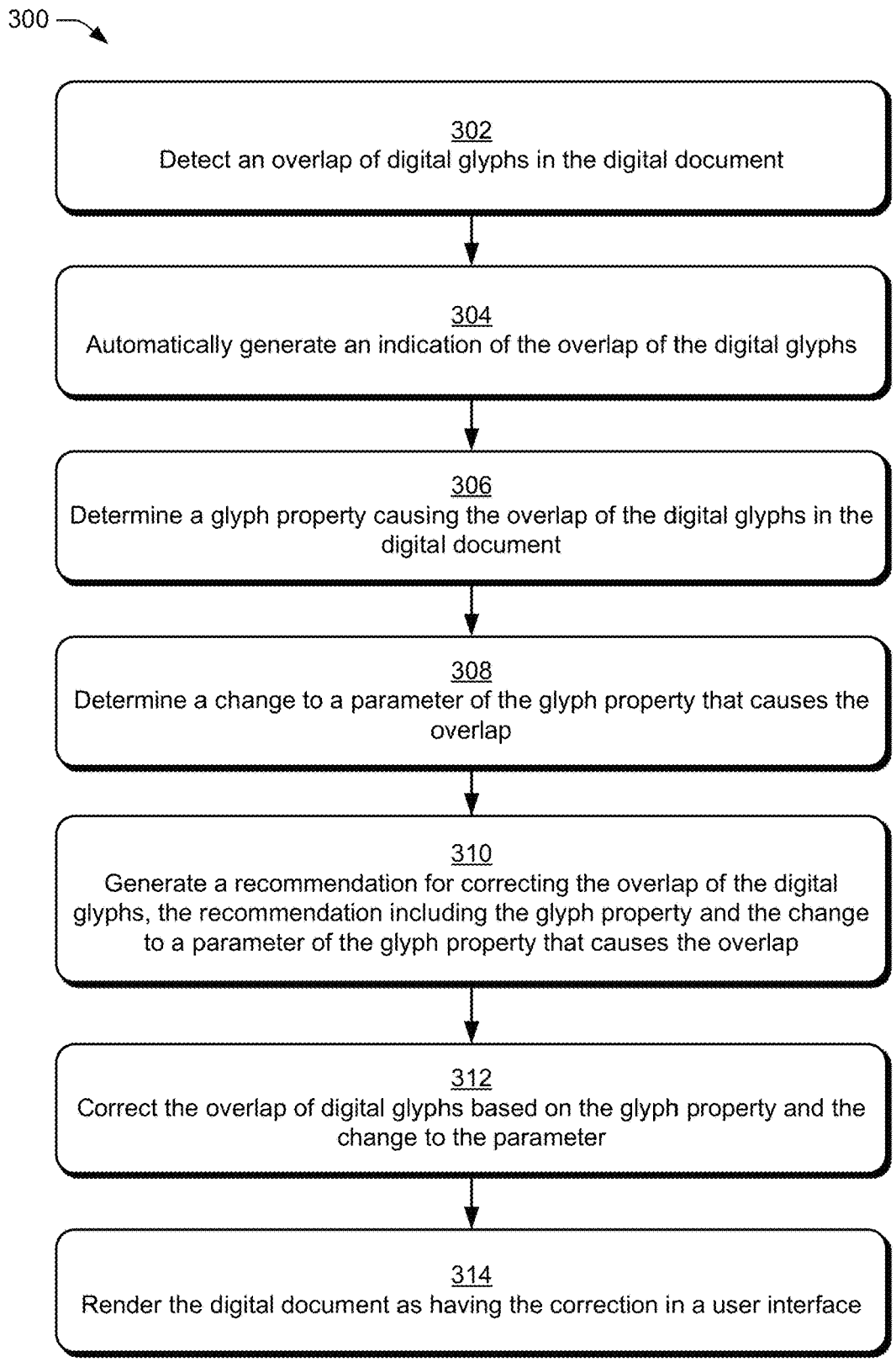
FIG. 3 depicts a flow diagram depicting an example procedure to correct an overlap of digital glyphs within a digital document and render the corrected digital document in a user interface.
Figure 4:
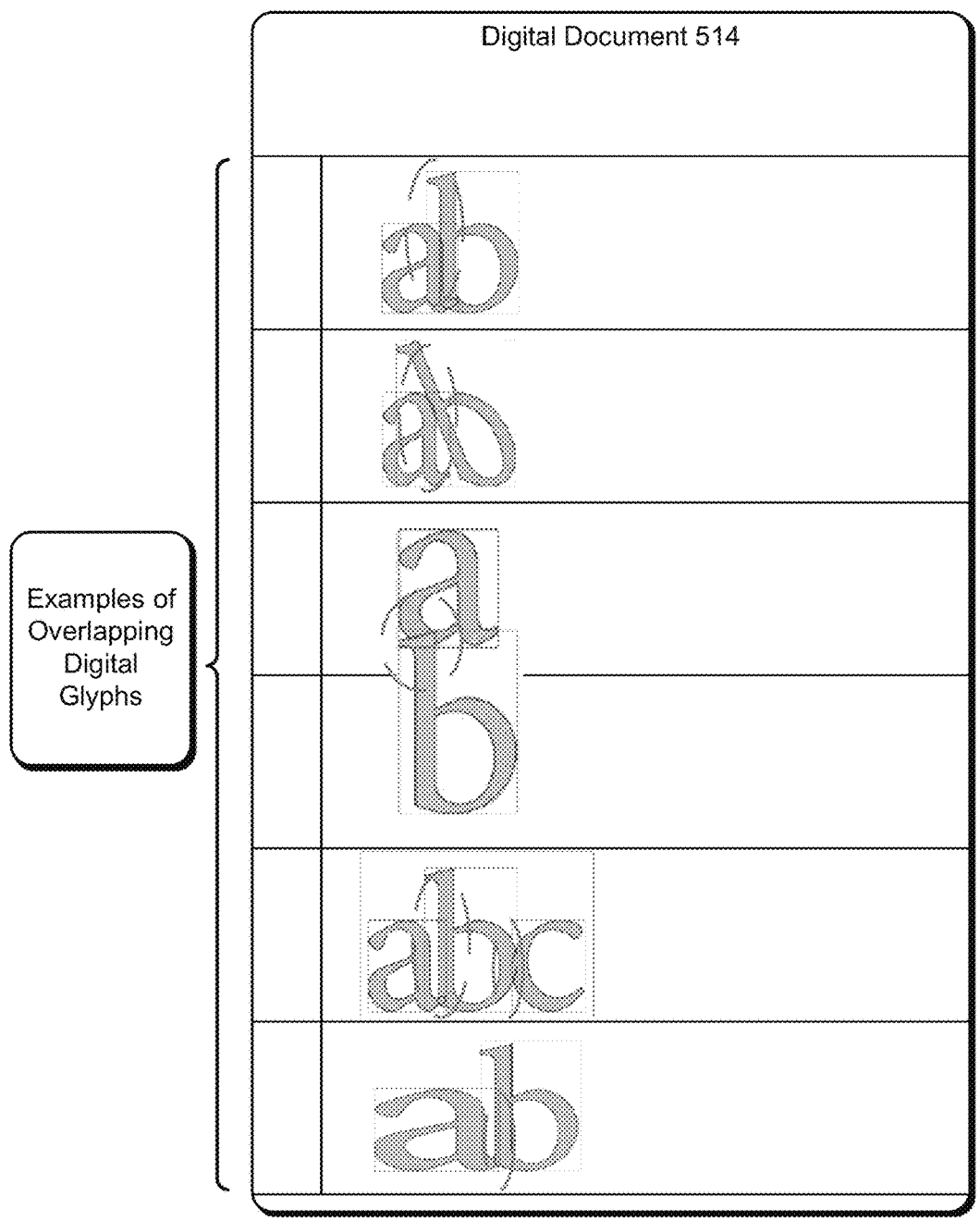
FIG. 4 depicts examples of errors related to digital glyphs within the digital document. Each set of glyphs overlap in different ways, some within a single line of text and others in adjacent lines.

FIG. 2 depicts a system 200 in an example operation of the digital glyph correction manager module 116 of digital glyph overlap correction system 104 is shown in greater detail. FIG. 3 depicts a procedure 300 in an example of the glyph overlap correction techniques described herein. FIG. 4 depicts various examples of overlaps of digital glyphs within a digital document.

The following discussion describes techniques that may be implemented utilizing the described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In the following discussion, reference is made interchangeably to FIGS. 2-9.

FIG. 4 depicts examples of overlaps of digital glyphs in a digital document caused by an incorrect parameter value of a digital glyph property such as kerning, poorly defined baselines, incorrectly defined tracking etc. Such overlaps, when present throughout the digital document, reduce the legibility of content within the digital document and worsen the digital document's overall design quality and appearance.

FIGS. 5A-5D depicts example operation 500 of digital glyph overlap correction system 104 being performed the modules depicted in FIG. 2. Example operation 500 is shown in first, second, third, fourth, fifth, and sixth stages 502, 504, 506, 508, 510, and 512 in FIGS. 5A-5D.

Figure 5A:
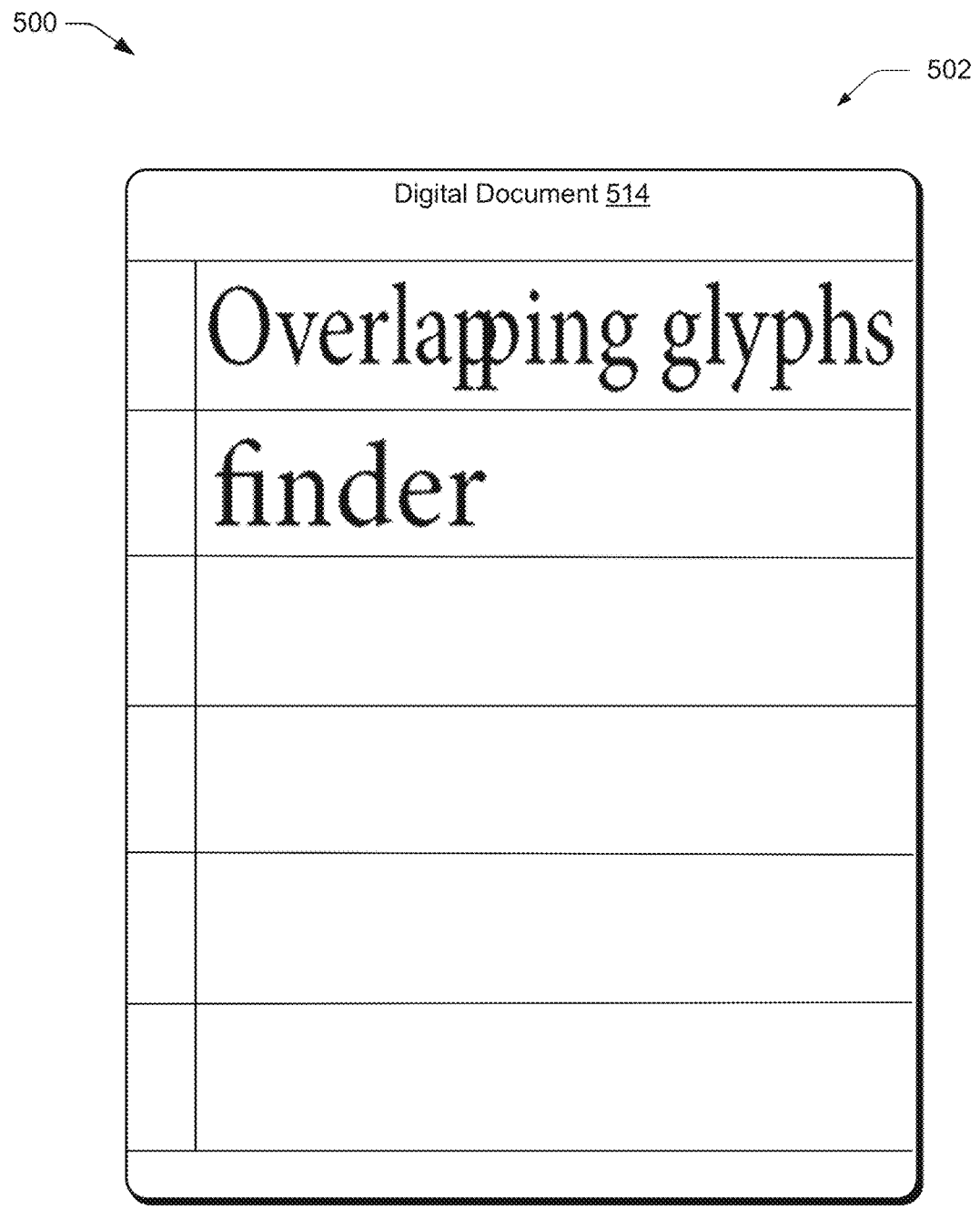
FIG. 5A depicts an example of a digital document within with digital glyphs on two separates lines of text. The first line includes two glyphs representing the letter "P" overlapping.
Figure 5B:
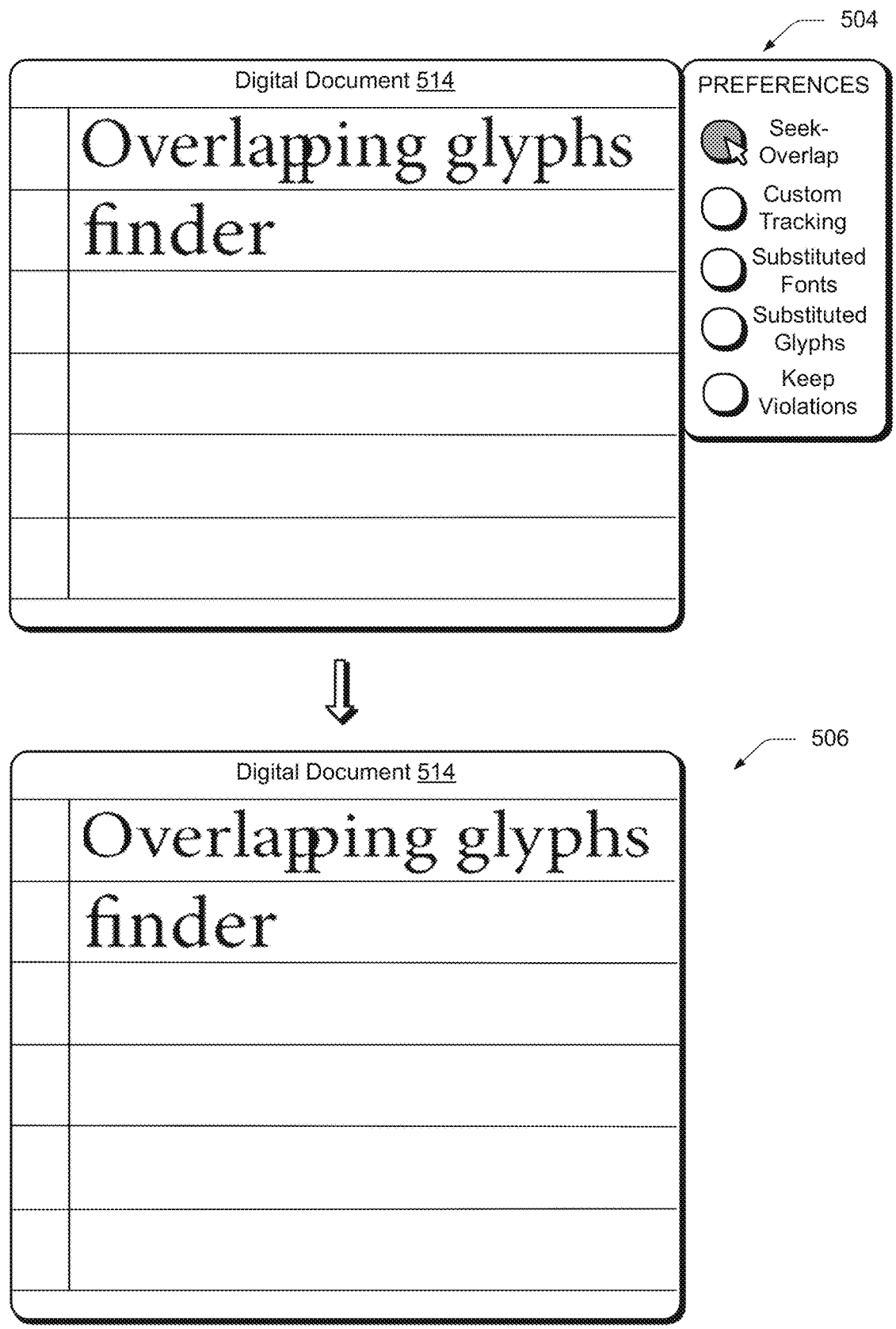
FIG. 5B depicts an activation of a seek overlap feature that, when selected, detects overlap or overlaps of digital glyphs within a digital document.
Figure 5C:
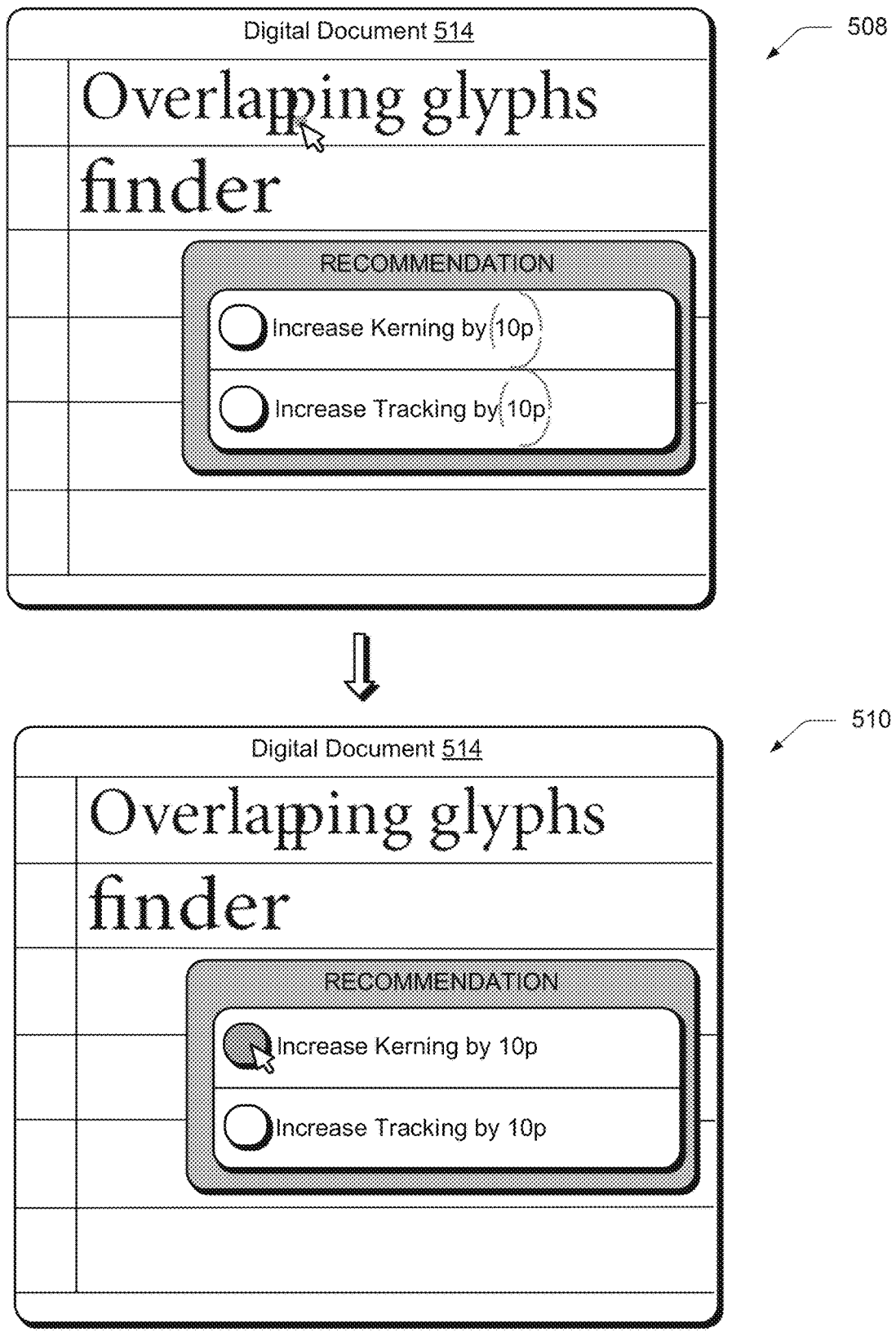
FIG. 5C depicts an example of an indication of the overlap within the digital document. In this example, the two overlapping glyphs representing the letter "P" are highlighted.

At first stage 502, a digital document 514 is shown to include multiple text lines. The first and second text lines include the digital glyph characters representing the words "Overlapping glyphs," and "Finder." As shown, two glyphs representing the letter "P" are overlapping. At second stage 504, a user may select, via user input 212, a "seek-overlap" feature. The user input 212 can be based on, e.g., a "tap" gesture or "click" operation performed via user interface 122. From this, the digital glyph correction manager module 116 applies the seek-overlap feature to digital document 514. Upon application of the seek-overlap feature, an overlap detection module 202 detects an overlap within the digital document 514 (block 302). As shown in FIG. 5B, two glyphs representing the letter "P" in the phrase "Overlapping glyphs" are overlapping. While a single overlap is depicted in FIGS. 5A-5D, multiple overlaps can be automatically detected within the digital document 514.

Figure 8A:
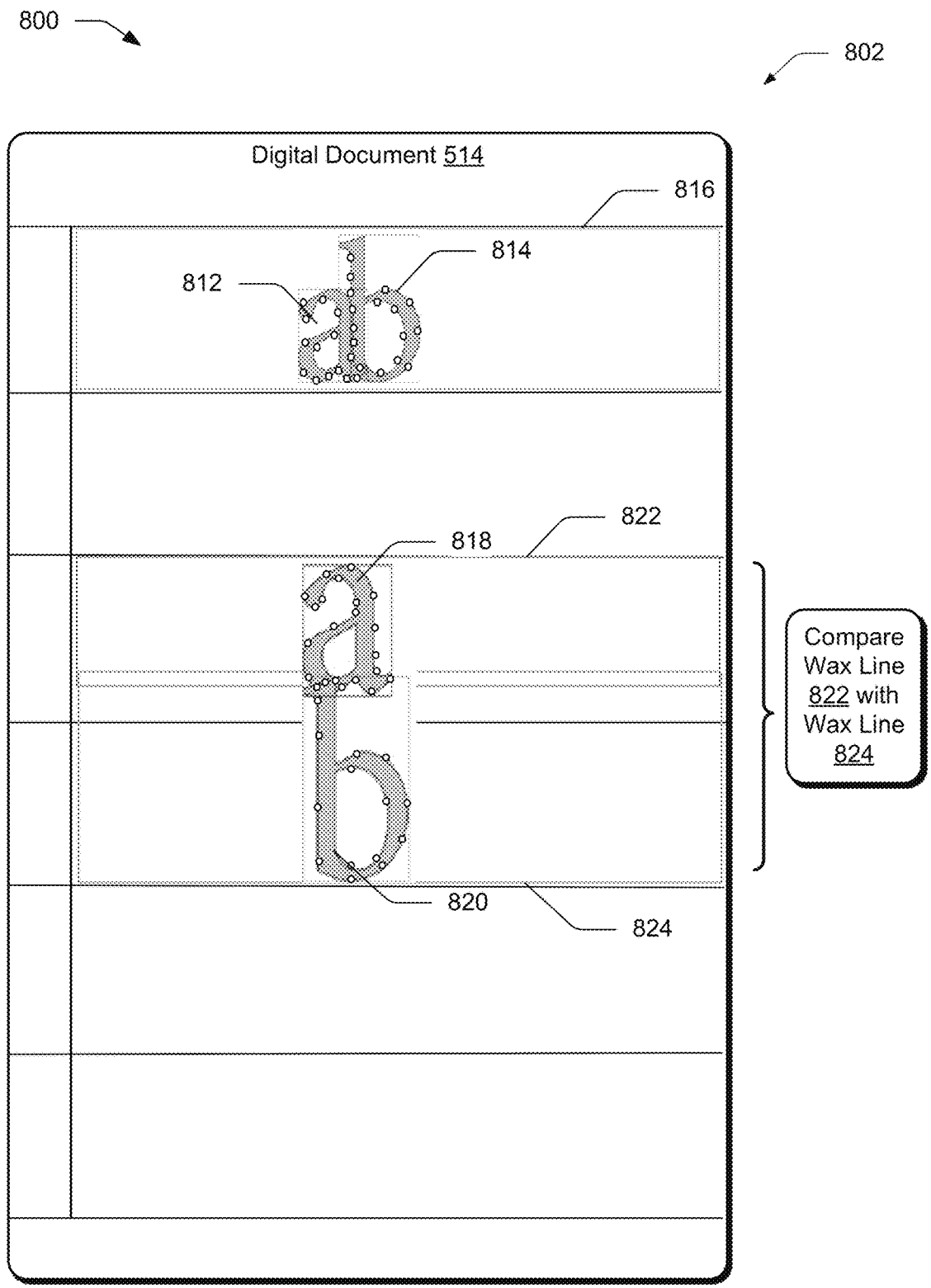
FIG. 8A depicts two types of overlaps in digital glyphs with the glyphs including outline points that define the shape and contours of each glyph. The glyphs are also shown with wax lines and bounding boxes.
Figure 8B:
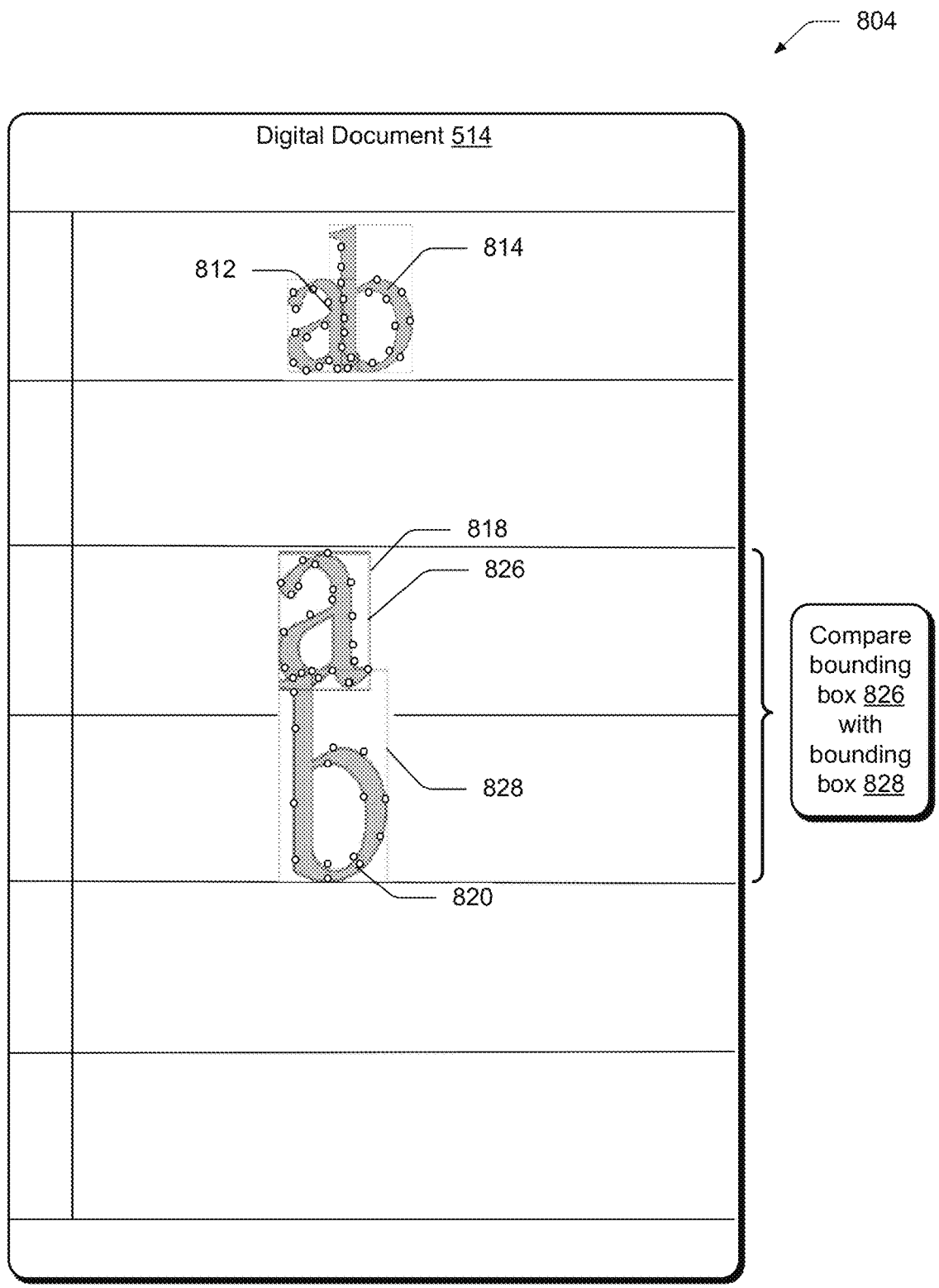
FIG. 8B emphasizes the bounding boxes of two glyphs displayed on adjacent text lines.
Figure 8C:
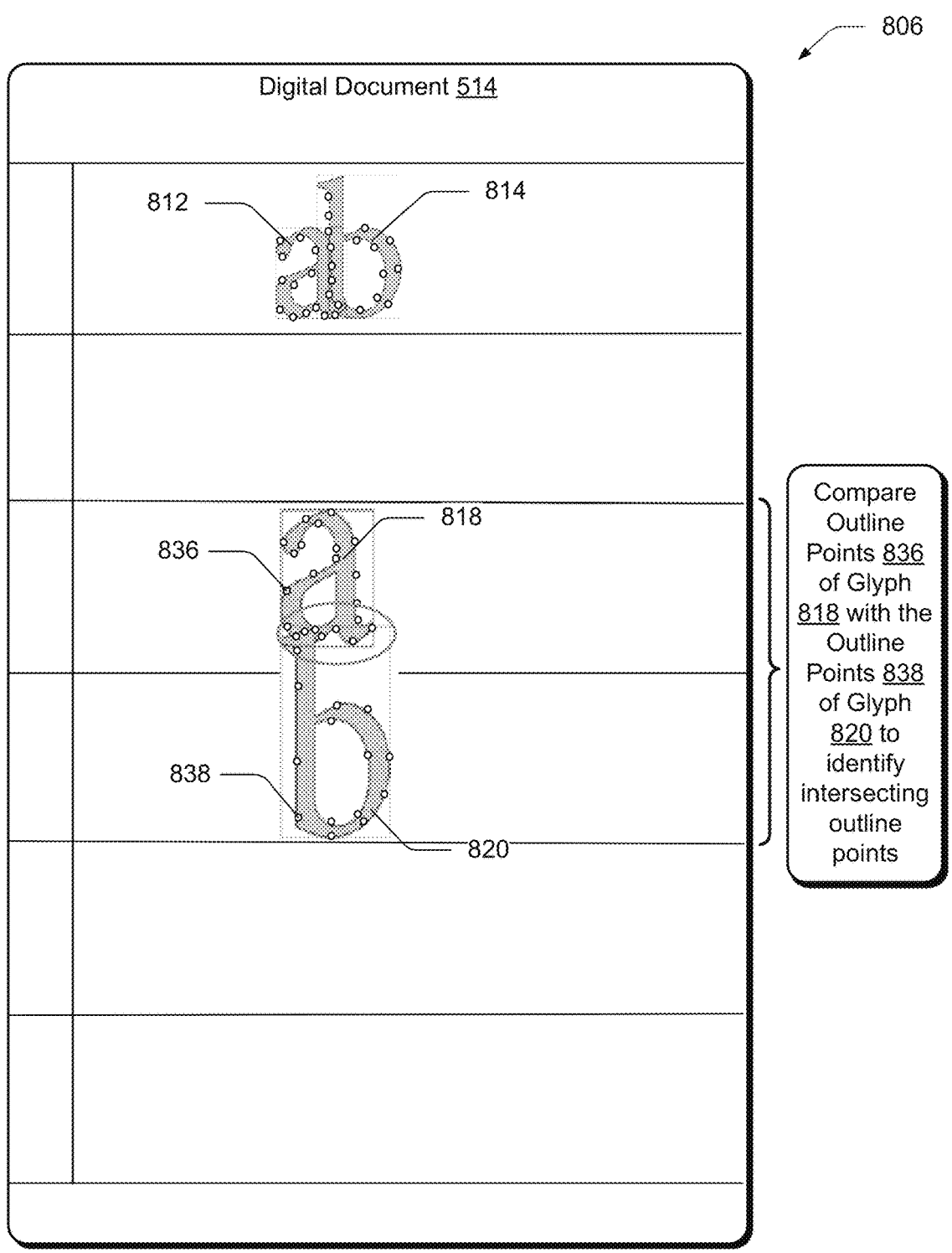
FIG. 8C depicts intersecting outline points of the two glyphs on adjacent text lines.

The processes implemented by the overlap detection module 202 to detect one or more overlaps of digital glyphs are described in detail below and shown in first, second, third, fourth, and fifth stages 802, 804, 806, 808, and 810 in FIGS. 8A-8E. FIGS. 8A-8E depicts the processes implemented by the overlap detection module 202 to detect two categories or types of overlaps in digital glyphs—overlap within a single line of text and overlap across adjacent lines. FIGS. 8A-8C detail the overlap detection module 202 detecting an overlap of digital glyphs across adjacent lines, and FIGS. 8D and 8E detail overlap of digital glyphs within a single line.

At first stage 802 in FIG. 8A, a bottom portion of digital glyph character representing the letter "a" and a top portion of digital glyph character representing the letter "b" overlap. Moreover, letter "a" is depicted on the third line and the letter "b" is depicted on an adjacent line—line 4. While an overlap in adjacent lines, overlap detection module 202 is also configured to detect multiple overlaps of digital glyphs in adjacent lines throughout the digital document 514.

To detect the overlap, the overlap detection module 202 begins by caching or storing the bounds of each wax line included in the digital document 514. As stated, a wax line refers to a data structure associated with each text line in a digital document, e.g. digital document 514. A wax line traces the boundaries of each text line in the digital document, and stores information associated with each text line, e.g., position of the line within the document, the number of characters in the line, line break data, etc. The wax line can also include data such as the x and y coordinates of the wax line, width data, origin, and span data.

In this example, if there are "n" number of wax lines within the digital document 514, the "n" number of wax lines and the order in which these wax lines appear will be stored within memory 120 of computing device 102. In addition, properties defining bounds of the wax lines, e.g., properties such as x and y coordinates of the wax lines, width, origin, and span of each wax line is also stored. Caching each wax line is a processing step that precedes detection of an overlap of digital glyphs.

With respect to digital document 514 depicted in first stage 802 of FIG. 8A, each text line included in the digital document 514 is associated with a respective wax line. The wax lines are shown in the form of boxes 816, 822, and 824. After performing the processing step, the overlap detection module 202 compares wax line 822 associated with first adjacent digital glyph 818—digital glyph representing the letter "a"—with wax line 824 associated with second adjacent digital glyph 820—digital glyph representing the letter "b." Specifically, the overlap detection module 202 determines whether the wax lines 822 and 824 intersect by comparing the cached bounds of wax lines 822 and 824. At first stage 802, wax line 822 associated with first adjacent digital glyph 818 includes a top portion of second adjacent digital glyph 820. So, overlap detection module 202 assesses that a possible overlap between the digital glyphs exists, and performs an additional step of comparing the bounding boxes of the two adjacent digital glyphs.

At second stage 804, the overlap detection module 202 compares the bounding box 826 of first adjacent digital glyph 818 with the bounding box 828 of second adjacent glyph 820 to determine if the comparison satisfies an adjacent bounding box threshold value. Specifically, the overlap detection module 202 compares the two bounding boxes to determine if one or more values defining the bounding boxes overlap, intersect, or are within a predefined threshold value. As stated, a bounding box traces a perimeter of a digital glyph such that the distance between the box and the glyph is minimized. In other words, the bounding box closely traces the outer bounds of the digital glyph, providing an accurate estimate of the space occupied by the digital glyph within the digital document 514. The bottom portion of bounding box 826 around first adjacent digital glyph 818 includes a portion of second adjacent digital glyph 820, and the top portion of bounding box 828 includes a portion of first adjacent digital glyph 818.

From this, overlap detection module 202 determines that there might be an overlap between two digital glyphs in adjacent lines, and performs yet another step in order to ensure the accuracy of overlap detection. In particular, after determining that the bounding boxes of digital glyphs in adjacent lines intersect, the overlap detection module 202, compares the outline points of first adjacent digital glyph 818 with second adjacent digital glyph 820. The outline points are depicted as circles throughout various portions of the digital glyphs. As stated, outline points of a digital glyph refers to a set of points that define the shape and contours of the glyph. The points can define, e.g., Bezier paths or composite Bezier curves, which provide the digital glyph its shape. The shape can also be based on other properties.

At third stage 806, the overlap detection module 202 compares the first adjacent glyph outline points 836 of the first adjacent digital glyph 818 with the second adjacent glyph outline points 838 of second adjacent digital glyph 820. The overlap detection module 202 extracts the outline points from distinct glyph identifiers associated with each of the first adjacent digital glyph 818 and second adjacent digital glyph 820. After the comparison, the overlap detection module 202 determines if there are any overlapping or intersecting outline points. For example, overlap detection module 202 will determine whether one or more of the outline points defining first adjacent digital glyph 818 lies within a predefined threshold distance value of one or more of the outline points defining second adjacent digital glyph 820. As depicted, outline points in the defining the bottom portion of first adjacent digital glyph 818 and outline points defining the top portion of second adjacent digital glyph 820 likely intersect (i.e. are within a threshold distance value). Accordingly, overlap detection module 202 determines that first adjacent digital glyph 818 and second adjacent digital glyph 820 intersect across adjacent lines.

Overlap detection module 202 is also configured to detect an overlap of digital glyphs within the same text line. Similar to the previous example, the overlap detection module first caches the bounds of wax lines within the digital document 514. Then, as digital glyphs within the same text line (which is associated with a single wax line) are analyzed, the overlap detection module compares bounding boxes of digital glyphs within the same text line.

Figure 8D:
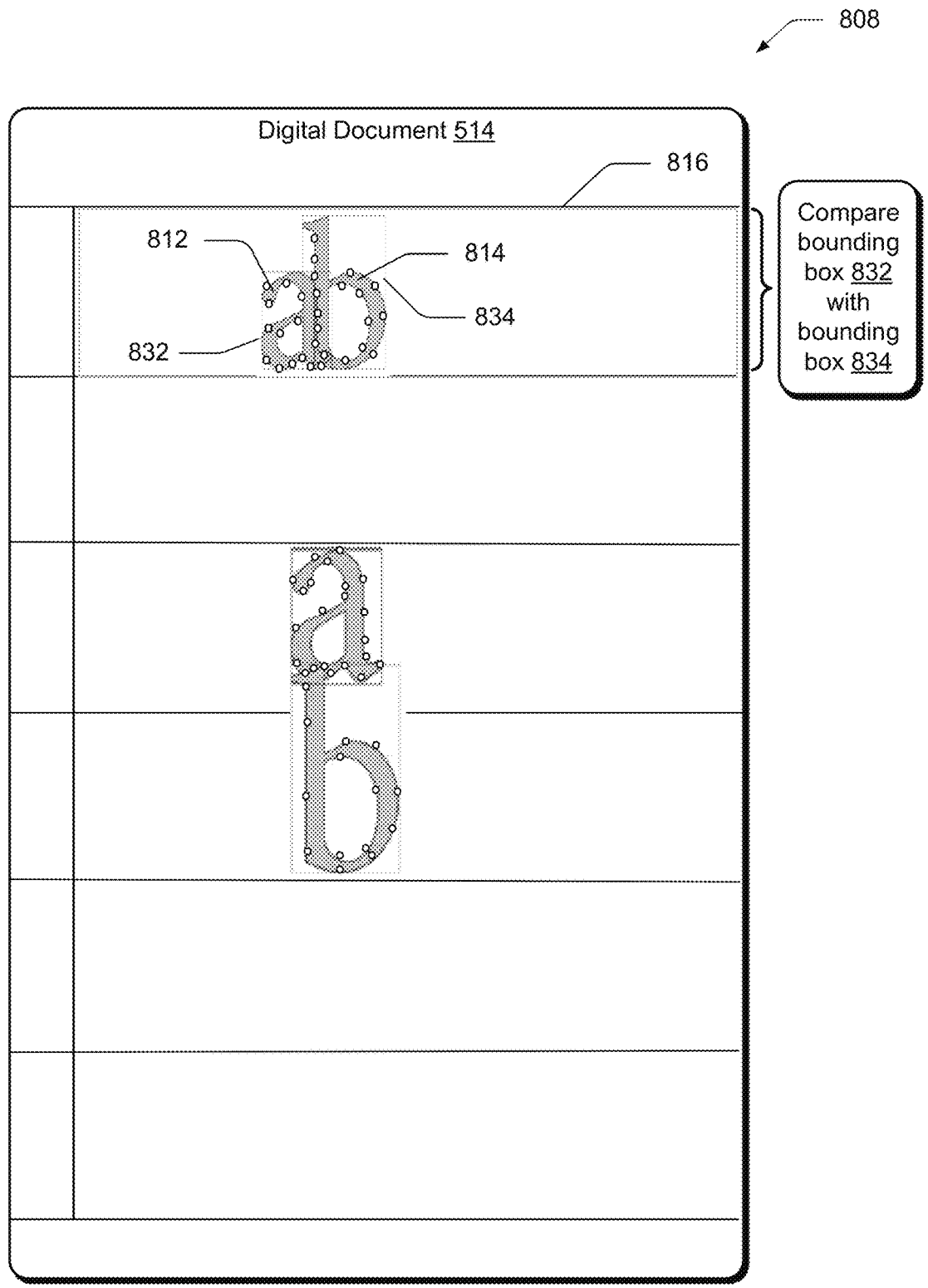
FIG. 8D emphasizes the bounding boxes of two glyphs displayed on the same text line.
Figure 8E:
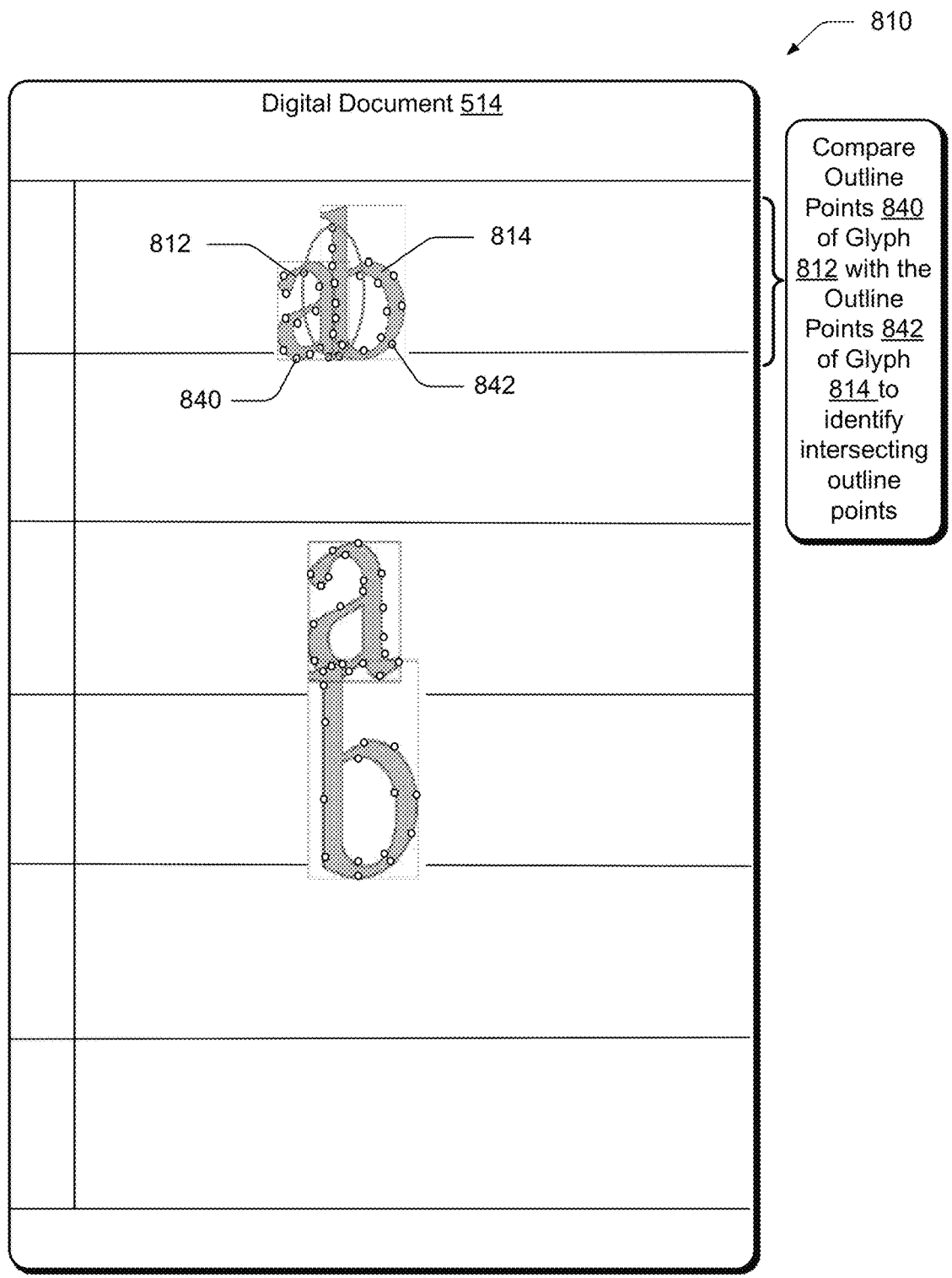
FIG. 8E depicts intersecting outline points of the two glyphs on the same text line.

As depicted in fourth stage 808 in FIG. 8D, first digital glyph bounding box 832 of first digital glyph 812 is compared with second digital glyph bounding box 834 of second digital glyph 814. The right portion of first digital glyph 812—digital glyph representing the letter "a"—is within the digital glyph bounding box 834 of second digital glyph 814. Additionally, the left portion of second digital glyph 814—digital glyph representing the letter "b"—is within the digital glyph bounding box 832 of first digital glyph 812.

From this, overlap detection module 202 determines that a possible overlap between digital glyphs within the same text line exists and performs the additional step of comparing the outline points of first digital glyph 812 and second digital glyph 834. At fifth stage 810, the overlap detection module 202 compares the first glyph outline points 840 of the first digital glyph 812 with the second glyph outline points 842 of second digital glyph 814. The overlap detection module 202 extracts the outline points from distinct glyph identifiers associated with each of the first adjacent digital glyph 818 and second adjacent digital glyph 820, which are stored within memory 120 of the computing device 102. After comparing, the overlap detection module 202 determines if there are any overlapping outline points. For example, overlap detection module 202 will determine whether one or more of the outline points defining first digital glyph 812 lies within a predefined threshold distance value of one or more of the outline points defining second digital glyph 814. As depicted, outline points defining the right portion of first adjacent digital glyph 812 and outline points defining the left portion of second digital glyph 814 likely intersect (i.e. are within a threshold distance value). Accordingly, overlap detection module 202 determines that these glyphs intersect.

Figure 6:
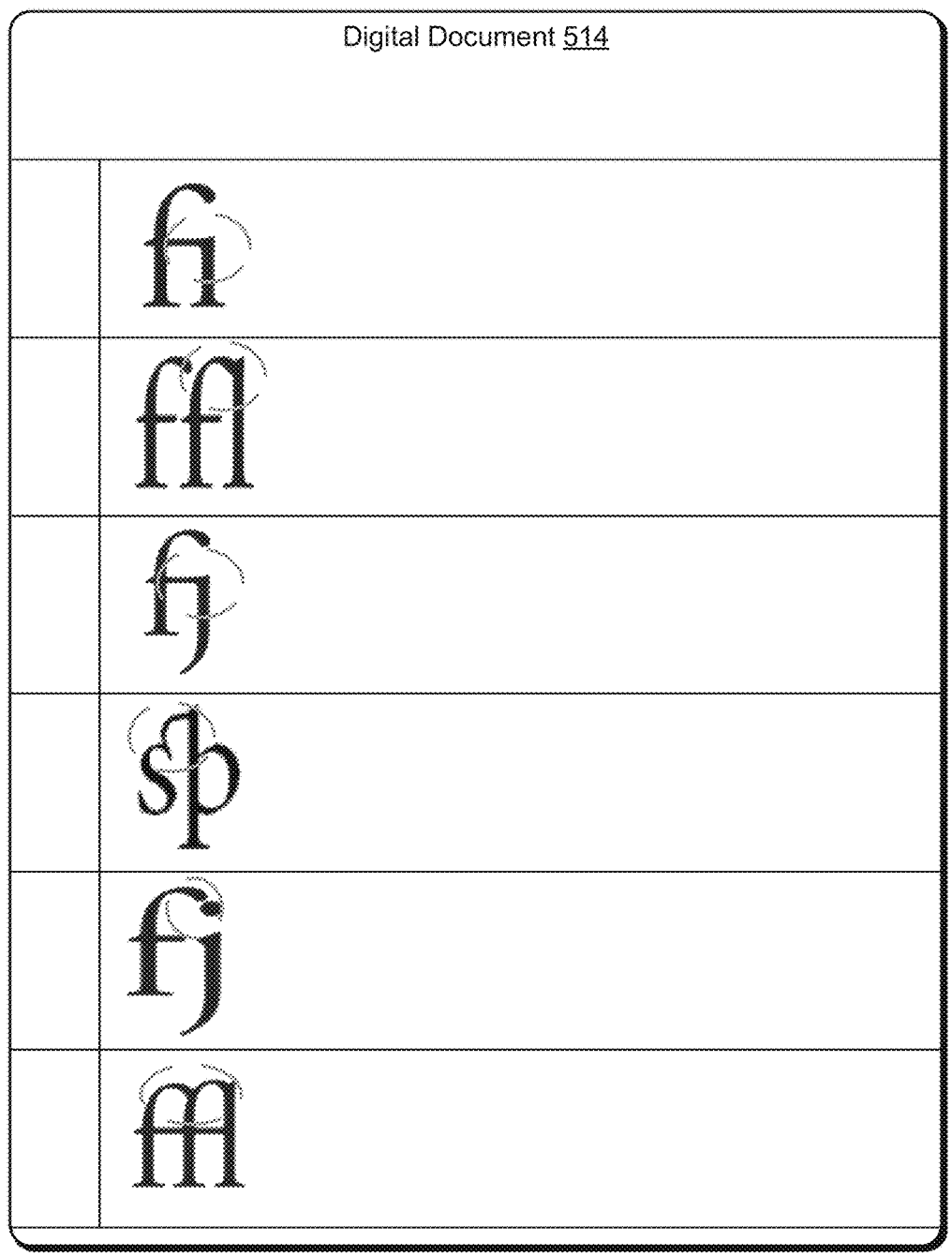
FIG. 6 depicts examples of digital glyphs that are based on ligatures and discretionary ligatures. The digital glyph overlap correction system described herein analyzes these ligatures and discretionary ligatures and does not identify these glyphs as containing overlaps.

In this way, overlaps digital glyphs within a single text line and across adjacent text lines are efficiently detected by the overlap detection module 202. Another advantage of the digital glyph overlap correction system 104 described herein is that the detection process is more accurate than conventional techniques. In part because the overlap detection module 202 distinguishes between an overlap between digital glyphs and digital glyphs that are based on ligatures and discretionary ligatures. FIG. 6 depicts ligatures and discretionary ligatures with instances that are similar to overlaps. Portions of these ligatures and discretionary ligatures that may appear as an overlap of digital glyphs are actually intentional design features of these glyphs. For example, the extension of the line across the middle of the letter "f" to the top of the letter "i" on the first line and the extension of the top of the letter "s" to the letter "p" on the fourth line are a few examples of the designs of ligatures and discretionary ligatures.

In the digital document 514, the overlap detection module 202 identifies these ligatures and discretionary ligatures, analyzes their designs, and determines that the curves and shapes of these ligatures and discretionary ligatures are design features, not overlaps. In this way, the digital glyph overlap correction system 104 accurately detects one or more overlaps of digital glyphs within the digital document 514.

From this, at third stage 506, an overlap indication module 204 automatically indicates the detected overlap by highlighting it (block 304). As shown, the two glyphs representing letter "P" appears with a different color than the remaining glyphs. Other forms of indications, such as rendering of boxes around the digital glyphs, underlining the glyphs etc., are also contemplated. In essence, by generating the indication or indications, the overlap indication module 204 enables users to identify overlaps of digital glyphs within the digital document 514 with efficiency and ease. From this, a glyph property determination module 206 determines a glyph property causing the overlap of the digital glyphs in the digital document 514 (block 306). As stated, the overlap can be based on a parameter of a glyph property, e.g., kerning, layout design, skewing, scaling, baseline shift etc., having an incorrect value. After the glyph property is identified, a parameter module 208 determines a change to a parameter of the glyph property causing the overlap (block 308).

Figure 5D:
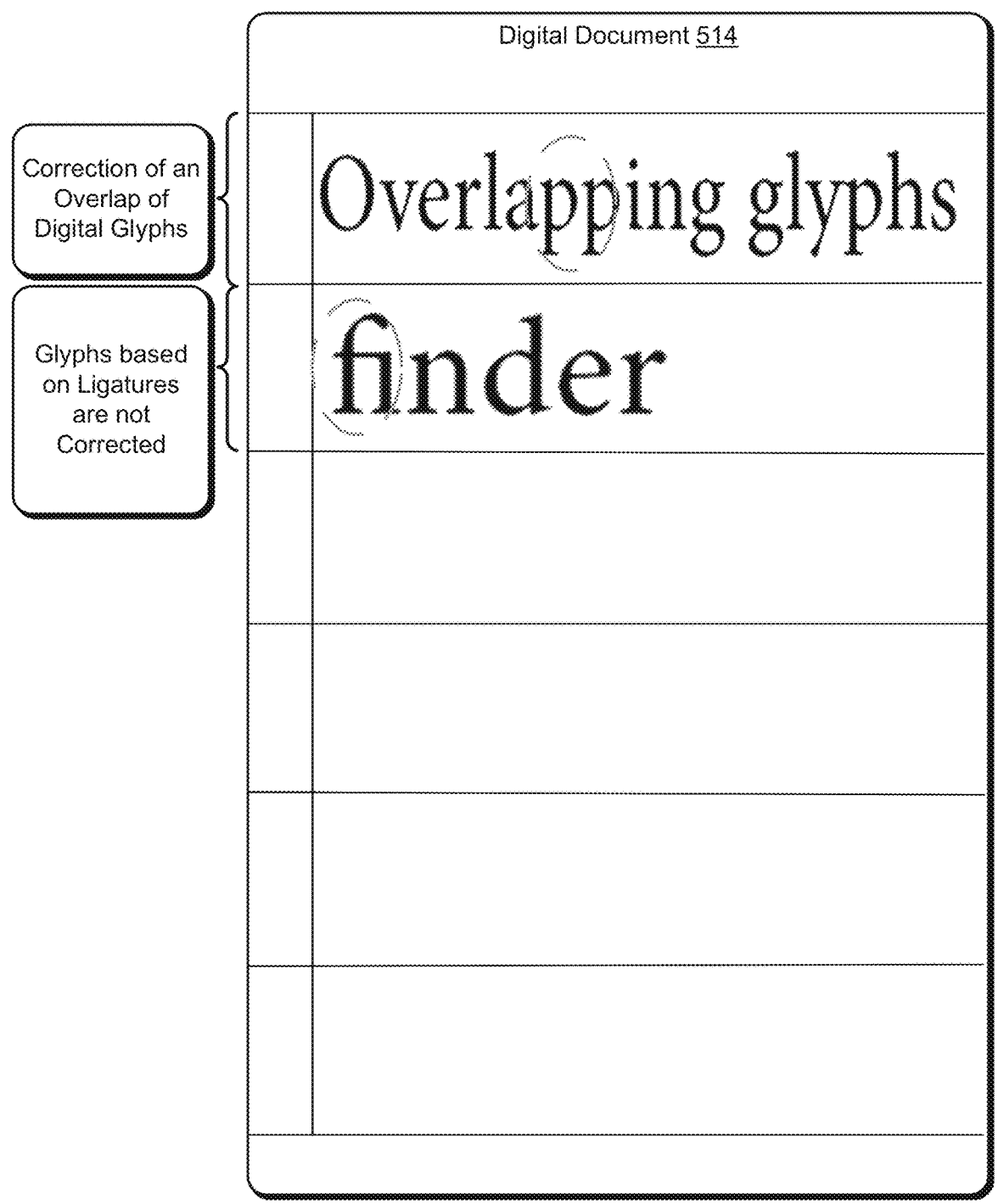
FIG. 5D depicts user interaction with the highlighted overlap that causes the digital glyph correction system to present a dialog box with the glyph properties kerning and tracking and parameters of "10p" associated with each of the glyph properties.

From this, a recommendation module 210 generates a recommendation for correcting the overlap of the digital glyphs (block 310). The recommendation includes the glyph property determined by the property determination module 206 and the parameter determined by the parameter module 208. In one example, as shown in fourth stage 508, the recommendation module 210 generates a recommendation with two glyph properties and a change to a parameter associated with each of the respective glyph properties. In this example, the glyph property determination module 206 has determined that the glyph properties of kerning or tracking can cause the overlap of two glyph representing the letter "P." So, correcting a parameter of either Kerning or Tracking should correct the overlap of the glyphs representing the letter "P." In one example, a reception module 214 receives a user input 212, via user interface 122, selecting an option included as part of the recommendation. At fifth stage 510, in one example, the reception module 214 receives a selection of increasing the glyph property of kerning by, e.g., a value of 10. Upon this selection, a correction module 216 corrects the overlap of the digital glyphs—the two digital glyphs representing the letter "P"—based on the glyph property of Kerning and the change to the parameter by a value of 10 to the Kerning (block 312). Finally, at sixth stage 512 rendering module 218 renders the digital document 514 as having the correction in user interface 122 (block 314). As shown in FIG. 5D, the phrase "Overlapping glyphs" no longer has an overlap.

Alternatively, the correction module 216 is configured to correct one or more overlaps of digital glyphs automatically and without user intervention. In such an example, the overlap detection module 202 automatically detects one or more overlaps of digital glyphs within the digital document 514 and overlap indication module 204 automatically indicates each of the detected overlaps in user interface 122. From this, the glyph property determination module 206 determines a glyph property that caused the overlap or overlaps and a parameter module 208 determines a change to a parameter of the determined glyph property. Such a glyph property could be, e.g., kerning. Thereafter, correction module 216 automatically corrects the one or more overlaps of digital glyphs in the digital document 514 based on the change to the parameter. In this example, the overlap detection, the glyph property and parameter determination, and the subsequent overlap correction is seamless, as it does not include the step of the recommendation module 210 generating a recommendation and the correction module correcting the overlap based on a user input.

Figure 7:
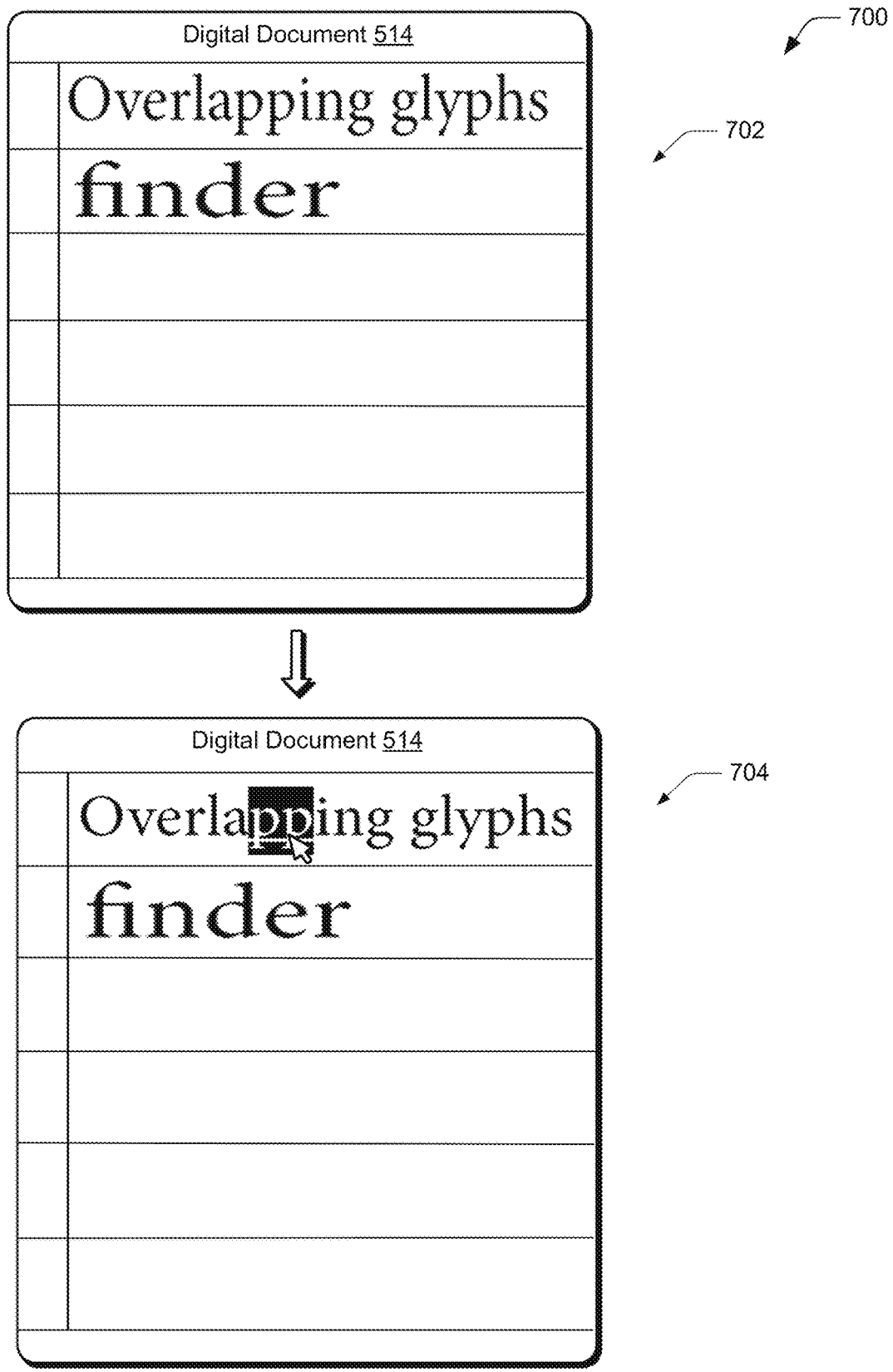
FIG. 7 depicts the digital glyphs as remaining live and editable before and after the overlap is corrected. The glyphs representing the letter "P" are highlighted and underlined.

FIG. 7 depicts an advantage of the digital glyph overlap correction system 104 described herein. Example operation 700 is shown in first and second stages 702 and 704 in FIG. 7. At first stage 702, the digital document 514 with digital glyphs whose overlap was corrected is shown. After correction, each of the glyphs are live and editable. In other words, the glyphs are not rasterized or converted to outlines, which enables the digital glyph overlap correction system 104 to change properties of the glyphs before and after the overlap is corrected. In one example, at second stage 704, the glyphs representing letter "P" are underlined after the correction module 216 corrects the overlap of the digital glyphs. In addition, increasing the font size of the digital glyphs is also possible. Alternatively, in another example (not shown), the digital glyph overlap correction system 104 facilitates changes to the font size of digital glyphs before their overlap is corrected. In this way, the digital glyph overlap correction system 104 has the advantage of maintaining the digital glyphs as live and editable glyphs before and after correction of an overlap, thereby providing greater glyph design flexibility and functionality.

In this way, the digital glyph overlap correction system 104 overcomes the limitations of conventional techniques, namely the inability of conventional techniques to identify overlaps of digital glyphs within the digital document 514 without requiring the user to manually review each line of text or text frames within the document 514, or suggest a way of correcting the overlap after the overlap is identified. The digital glyph overlap correction system 104 described herein identifies one or more overlaps of digital glyphs in a single text line or across adjacent text lines. Moreover, the digital glyph overlap correction system 104 corrects or facilitates correction of the overlap in an efficient and seamless manner by discerning the differences between overlaps of digital glyphs and digital glyphs based on ligatures and discretionary ligatures, thereby accurately reducing occurrence of digital glyph overlaps within the digital document 514. In this way, the system described herein improves the aesthetic appeal of the digital document 514.

Figure 9:
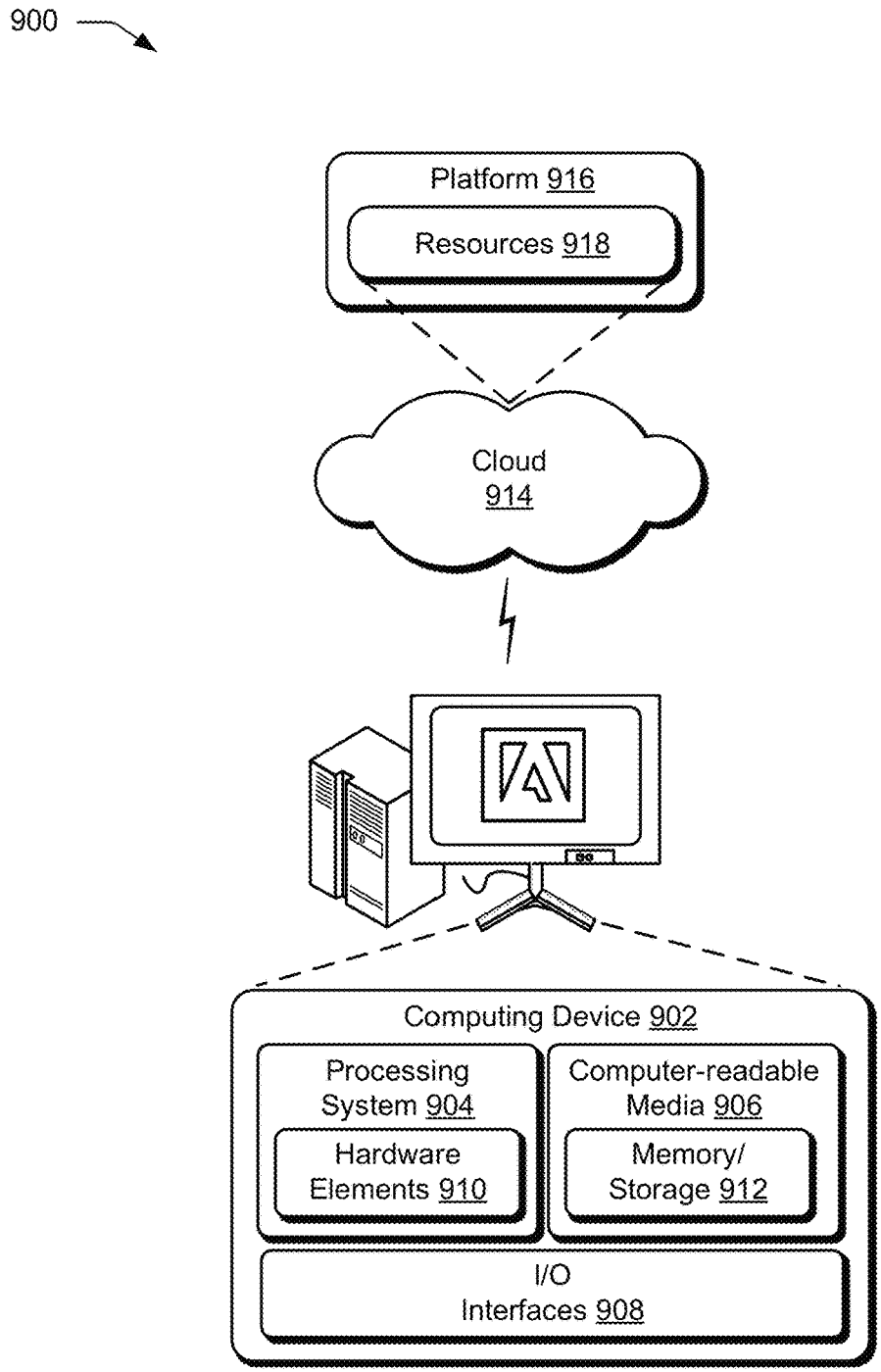
FIG. 9 illustrates an example system including various components of an example device that can be implemented at any time by the computing device as described and/or utilized with references to FIGS. 1-8 to implement examples of the techniques described herein.

FIG. 9 illustrates an example system generally at 900 that includes an example computing device 902 that is representative of one or more computing systems and/or devices that may implement the various techniques described herein. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

What is claimed is:

1. In a digital content generating environment, a digital glyph overlap correction method, the method implemented by a computing device, the method comprising:
   detecting, by the computing device, an overlap of digital glyphs in a digital document;
   determining, by the computing device, which glyph property of a plurality of glyph properties cause the overlap of the digital glyphs in the digital document;
   determining, by the computing device, a change to a parameter of the determined glyph property that corrects the overlap;
   generating, by the computing device, a recommendation for output in a user interface for correcting the overlap of the digital glyphs, the recommendation indicating the glyph property and the change to the parameter of the glyph property to correct the overlap;
   correcting, by the computing device, the overlap of the digital glyphs by making the determined change to the parameter of the determined glyph property responsive to user selection of the recommendation; and
   rendering, by the computing device, the digital document as having the correction in a user interface.

2. The method as described in claim 1, wherein the detecting the overlap of digital glyphs includes:
   selecting a seek-overlap feature for the digital document; and
   applying the seek-overlap feature to the digital document.

3. The method as described in claim 1, further comprising:
   generating, automatically, an indication of the overlap of digital glyphs in a user interface of the computing device.

4. The method as described in claim 1, wherein detecting the overlap of digital glyphs comprises:
   identifying additional digital glyphs based on ligatures and discretionary ligatures;
   analyzing designs of the ligatures and the discretionary ligatures; and
   determining, based on the analyzing, that the additional digital glyphs based on the ligatures and the discretionary ligatures are not overlapping.

5. The method as described in claim 1, wherein the digital glyphs are live and editable before and after the generating of the correction of the overlap.

6. The method as described in claim 1, further comprising:
   detecting an additional overlap of digital glyphs in the digital document;
   generating automatically, an additional correction of the additional overlap of digital glyphs based on the glyph property and the glyph parameter; and
   rendering the digital document as having the additional correction of the additional overlap of digital glyphs in the user interface.

7. The method as described in claim 1, wherein generating the correction of the digital glyphs comprises:
   modifying a location of at least one of the digital glyphs based on the glyph parameter; and
   removing, based on the modifying, the overlap of the digital glyphs.

8. In a digital content generating environment, a digital glyph overlap correction system, the system comprising:
   a processor; and
   a computer-readable storage medium including instructions stored thereon that, responsive to execution by the processor, causes the processor to perform operations including:
   an overlap detecting module to detect an overlap of digital glyphs in the digital document;
   a glyph property determination module to determine which glyph property of a plurality of glyph properties cause the overlap of the digital glyphs in a digital document;
   a parameter module to determine a change to a parameter of the glyph property that corrects the overlap;
   a recommendation module to generate a recommendation for output in a user interface for correcting the overlap of the digital glyphs, the recommendation indicating the glyph property and the change to a parameter of the glyph property to correct the overlap;
   a correction module to correct the overlap of digital glyphs by making the determined change responsive to user selection of the recommendation; and
   an output module to render the digital document as having the correction in the user interface.

9. The system as described in claim 8, wherein the overlap detection module detects the overlapping glyphs by:
   analyzing wax lines corresponding to text lines included in the digital document, the wax lines defining properties of the text lines.

10. The system as described in claim 9, wherein the overlap detection module analyzing the wax lines comprises:
    comparing a first wax line of the wax lines with a second wax line of the wax lines, the second wax line is adjacent to the first wax line; and
    determining, based on the comparing, whether the first wax line and the second wax line intersect.

11. The system as described in claim 10, wherein the overlap detection module is further configured to:
    compare, upon determining that the first wax line and the second wax line intersect, a first bounding box of a first adjacent digital glyph included in the first wax line with a second bounding box of a second adjacent digital glyph included in the second wax line; and determine whether a result of comparing the first bounding box with the second bounding box satisfies an adjacent bounding box threshold value.

12. The system as described in claim 11, wherein the overlap detection module is further configured to:
 compare, upon determining that the result satisfies an adjacent bounding box threshold value, a first digital glyph outline of the first adjacent digital glyph with a second digital glyph outline of the second adjacent digital glyph, the first digital glyph outline is associated with a first glyph identifier and the second digital glyph outline is associated with a second glyph identifier;
 identify, based on comparing the first glyph outline with the second glyph outline, intersecting outline points associated with the first digital glyph outline and the second digital glyph outline; and
 determine, upon identifying the intersecting outline points, that the first digital glyph overlaps with the second digital glyph.

13. The system as described in claim 9, wherein the overlap detection module is further configured to:
 compare a first bounding box of a first digital glyph in a first wax line with second bounding box of a second digital glyph in the first wax line; and
 determine whether a result of the comparing satisfies a bounding box threshold value.

14. The system as described in claim 13, wherein the overlap detection module is further configured to:
 compare, upon determining that the result satisfies the bounding box threshold value, a first digital glyph outline of the first digital glyph in the first wax line with a second digital glyph outline of the second digital glyph in the first wax line, the first digital glyph outline is associated with a first glyph identifier and the second digital glyph outline is associated with a second glyph identifier;
 identify, based on comparing the first glyph outline with the second glyph outline, intersecting outline points associated with the first digital glyph outline and the second digital glyph outline; and
 determine, upon identifying the intersecting outline points, that the first digital glyph overlaps with the second digital glyph in the first wax line.

15. The system as described in claim 8, wherein the correction module generates the correction of the overlap of the digital glyphs by:
 modifying a location of at least one of the digital glyphs based on the glyph parameter; and
 removing, based on the modifying, the overlap of the digital glyphs.

16. The system as described in claim 8, wherein the digital glyphs are live and editable before and after the generating of the correction of the overlap.

17. The system as described in claim 8, further comprising:
 an overlap indication module to automatically generate an indication of the overlap of the digital glyphs.

18. One or more computer-readable storage media having stored thereon multiple instructions that, responsive to execution by a processor, cause the processor to perform operations comprising:
 detecting an overlap of digital glyphs in a digital document;
 determining which glyph property of a plurality of glyph properties cause the overlap of the digital glyphs in the digital document;
 determining a change to a parameter of the determined glyph property that corrects the overlap;
 generating a recommendation for output in a user interface for correcting the overlap based on the change to the parameter of the determined glyph property;
 correcting the overlap by making the determined change to the parameter of the determined glyph property responsive to user selection of the recommendation; and
 rendering the digital document as having the correction in a user interface.

19. The one or more computer-readable storage media as described in claim 18, wherein the digital glyphs are live and editable before and after the generating of the correction of the overlap.

20. The one or more computer-readable storage media as described in claim 18, wherein the detecting of the overlaps of digital glyphs includes:
 selecting a seek-overlap feature for the digital document; and
 applying the seek-overlap feature to the digital document.

* * * * *